May 27, 1930. D. D. BURCH Re. 17,674

OIL WELL PUMP

Original Filed Feb. 2, 1928

INVENTOR:
DONALD D. BURCH,
By Fred A. Lamir
ATTORNEY.

Reissued May 27, 1930 Re. 17,674

UNITED STATES PATENT OFFICE

DONALD D. BURCH, OF SHAWNEE, OKLAHOMA

OIL-WELL PUMP

Original No. 1,696,135, dated December 18, 1928, Serial No. 251,397, filed February 2, 1928. Application for reissue filed October 25, 1929. Serial No. 402,510.

This invention relates to oil well pumps and more particularly to an oil well pump employing air pressures and means for ejecting the oil from the well.

An important object of the invention is to provide a pumping apparatus which may be located at the bottom of the well and having cylinders which, by rotation imparted to a portion thereof from the surface of the ground, may be intermittently connected with the well bore to receive oil therefrom or to the source of air under pressure to cause the received oil to be ejected.

A further object of the invention is the provision of a device of this character which may be very readily and cheaply constructed, which will be durable and efficient in service and a general improvement in the art.

These and other objects I attain by the construction shown in the accompanying drawing, wherein for the purpose of illustration is shown a preferred embodiment of my invention and wherein:—

Figure 2:
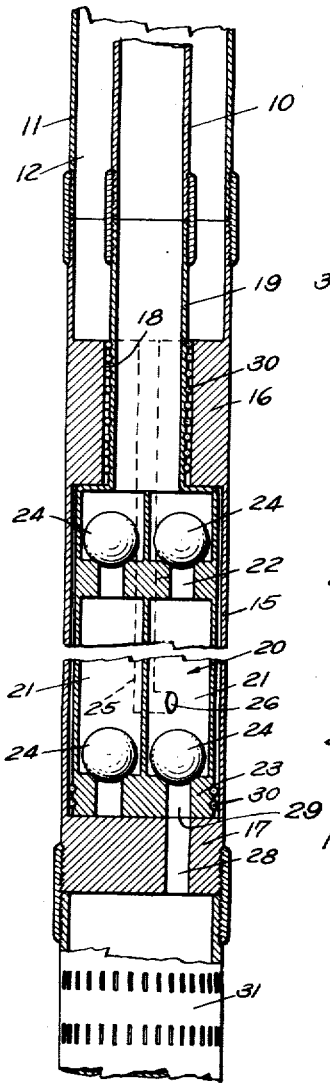
Figure 2 is a vertical sectional view through the pump proper, the view being taken on the section line 2—2 of Figure 4.
Figure 3:
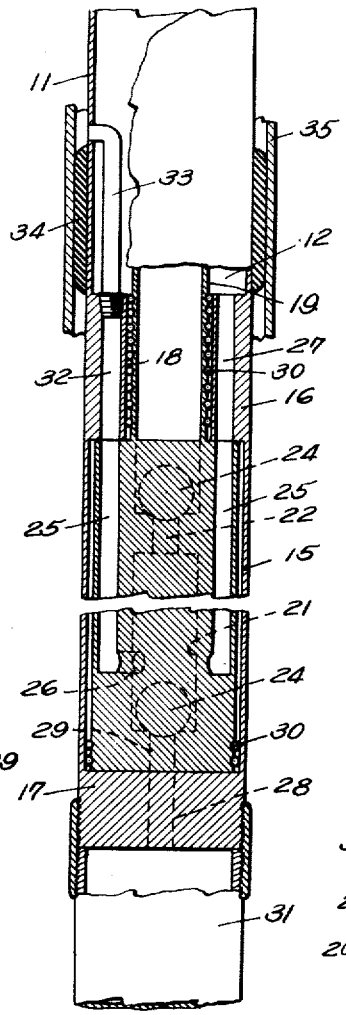
Figure 3 is a similar view taken on the line 3—3 of Figure 4.
Figure 1:
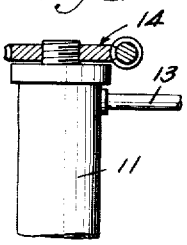
Figure 1 is a fragmentary sectional view showing the upper end of deep well pumping apparatus constructed in accordance with my invention.
Figure 4:
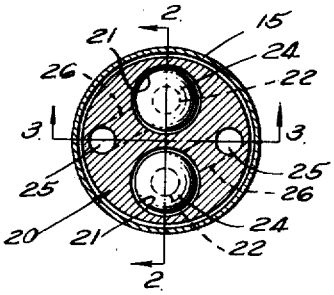
Figure 4 is a transverse sectional view through the pumping apparatus.

Referring now more particularly to the drawing, the numerals 10 and 11 indicate inner and outer casing strings, the space 12 between which is in communication at the upper end of the string with a source of air under pressure, indicated at 13. Means 14 are provided for rotating the inner string 10. The outer string 11 adjacent its lower end has secured thereto a barrel 15 having upper and lower heads 16 and 17. The head 16 is provided with an axial opening 18 and through this opening is directed the neck 19 of a combined cylinder and control valve element 20 which has a rotating fit with the interior of the barrel. The element 20 includes a pair of vertically extending cylinders 21, each of which communicates at its upper end with the interior of the neck 19 and each of which is provided adjacent its upper and lower ends with check valve seats 22 and 23 having check valves 24 coacting therewith. The combined cylinder and control valve element further embodies a pair of vertically extending ports 25, each opening at its upper end through the upper end of the element outwardly of the neck 19 and at its lower end into a cylinder bore 20 immediately above the lowermost check valve of the cylinder, as indicated at 26. The upper head 16 of the barrel 15 has a vertically extending port 27 which, as the combined cylinder and control valve 20 is rotated, will alternately align with the upper ends of the ports 25 thereof. The lower head 17 of the barrel has formed therein a port 28, which, as the combined cylinder and control valve is rotated, will alternately align with the port openings 29 of the lower check valve seats 23, alignment of the ports 29 and 28 occurring prior to the alignment of the associated port 25 with the port 27 of the head 16. The element 20 may be engaged with the barrel through bearings 30 to facilitate rotation thereof and may, of course, be packed in any suitable manner. The lower end of the barrel may be either directly or indirectly connected with the usual well string 31. The head 16 has a port 32 diametrically opposed to the port 27 and the upper end of which is in communication with one end of a conduit 33, the opposite end of which opens through the wall of the well string above the packer 34, by means of which such strings are usually sealed to the casing 35 of the well. This port is in communication with the port 25 of the control valve element 20 at the time when the associated cylinder is in communication with the port 28 of the lower head and serves as a relief, allowing air trapped in this cylinder to escape, so that fluid may rise therein.

In operation of the device assuming air pressure to be applied between the tubings 10 and 11 and the tubing 10 rotated, the cylinders will alternately align with the port 28, so that they may receive fluid from the well.

This fluid, displacing the air in the cylinder and causing the same to pass through the port 32 of the upper head, will rise in the cylinder 21 and when the port 25 associated with the cylinder aligns with the port 27 of the upper head of the barrel, air pressure will be introduced to the cylinder at the lower end thereof, ejecting the oil contained therein. Return of this oil will be prevented by the check valve 17. By properly sizing the ports 27 and 28, a substantially continuous flow of fluid from the well can be obtained.

Since the construction employed is obviously capable of a certain range of change and modification without materially departing from the spirit of the invention, I do not limit myself to such specific structure except as hereinafter claimed.

I claim:

1. In a deep well pump and in combination, an assemblage adapted to be disposed in the fluid contained in the well comprising a barrel having heads at its opposite ends and having a port in each head, the upper head having an axial opening and a combined cylinder and control valve element rotatable within the barrel and having a neck extending through the opening of the upper head, said element having cylinder bores each having at its lower end a check-valved opening adapted to align with the port of the lower head and at its upper end a check-valved outlet communicating with the neck and ports in said element opening through the upper end of the element and each communicating at its lower end with one of the cylinders, said ports during rotation of the element alternately aligning with the port of the upper head.

2. In deep well pumping apparatus, a barrel, a member rotatable in the barrel, concentric tubes connected to the barrel and element, means for introducing fluid pressure to the space between the tubes, means for rotating the inner tube, cylinders in the element and means operated by rotation of the element for alternately placing the lower ends of said cylinders in communication with the fluid in the well and with the space between the tubes, the upper ends of the cylinders communicating with the interior of the inner tube.

3. In deep well pumping apparatus, a barrel, a member rotatable in the barrel, concentric tubes connected to the barrel and element, means for introducing fluid pressure to the space between the tubes, means for rotating the inner tube, cylinders in the element, means operated by rotation of the element for alternately placing the lower ends of said cylinders in communication with the fluid in the well and with the space between the tubes, the upper ends of the cylinders communicating with the interior of the inner tube, and check valve means preventing pressure exerted in the cylinders from being transmitted to the fluid in the well.

4. In deep well pumping apparatus, a barrel, a member rotatable in the barrel, concentric tubes connected to the barrel and element, means for introducing fluid pressure to the space between the tubes, means for rotating the inner tube, cylinders in the element, means operated by rotation of the element for alternately placing the lower ends of said cylinders in communication with the fluid in the well and with the space between the tubes, the upper ends of the cylinders communicating with the interior of the inner tube, check valve means preventing pressure exerted in the cylinders from being transmitted to the fluid in the well, and check valve means preventing the pressure of fluid within the inner tube from being exerted in the cylinders to prevent the admission of fluid thereto.

5. In deep well pumping apparatus, a rotatable member adapted to be disposed within the well, a casing therefor having ports one in communication with a source of fluid under pressure and the other in communication with the fluid in the well and cylinders in the rotatable member the lower ends of which are alternately placed in communication with said ports as the member is rotated and means for rotating the rotatable member including a conduit communicating with the upper ends of said cylinders.

6. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit; valve means being situated in said well near said chamber and adapted to control the flow of fluid through said chamber; and means by which said fluid conduit may be mechanically operated from a point above and outside said well to operate said valve means.

7. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated in said well near said chamber and adapted to control the flow of fluid through said chamber; and means by which said fluid conduit may be mechanically rotated from a point above and outside said well to operate said valve means.

8. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated in said well near said chamber and adapted to control the flow of gas and liquid through said chamber; and means by which said fluid conduit may be mechanically operated from a point above and outside said well to operate said valve means.

9. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated in said well near said chamber and so constructed as to open and close a gas port through which gas may flow from said gas conduit into said chamber; and means by which said fluid conduit may be mechanically operated from a point above and outside said well to operate said valve means.

10. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated in said well near said chamber and so constructed as to open and close a gas port through which gas may flow from said gas conduit into said chamber; and means by which said fluid conduit may be mechanically rotated from a point above and outside said well to operate said valve means.

11. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated in said well near said chamber and so constructed as to open and close a gas port through which gas may flow from said gas conduit into said chamber; a liquid check valve adapted to close a liquid port connecting said chamber with the fluid in the well, said valve being so constituted as to prevent liquid from flowing from said chamber back into the well when said liquid check valve is closed and to allow a free passage of liquid from said well into said chamber when said valve is open; and means by which said fluid conduit may be mechanically operated from a point above and outside said well to operate said valve means.

12. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated in said well near said chamber and so constructed as to open and close a gas port through which gas may flow from said gas conduit into said chamber; a liquid check valve adapted to close a liquid port connecting said chamber with the fluid in the well, said valve being so constituted as to prevent liquid from flowing from said chamber back into the well when said liquid check valve is closed and to allow a free passage of liquid from said well into said chamber when said valve is open; a fluid check valve adapted to close an exit port connecting said fluid conduit and said chamber, said fluid check valve being so constituted as to prevent fluid from flowing back into said chamber from said fluid conduit when said liquid check valve is closed and to allow a free passage of fluid from said chamber into said fluid conduit when said liquid check valve is open; and means by which said fluid conduit may be mechanically operated from a point above and outside said well to operate said valve means.

13. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated adjacent to said chamber adapted to connect the upper portion of said chamber alternately with said gas conduit and with a port through which any gas under pressure in said chamber may escape therefrom; and means by which said fluid conduit may be mechanically operated from a point above and outside said well to operate said valve means.

14. In a pump, the combination of: a member containing an enclosed chamber; a fluid conduit communicating with said chamber and extending upwardly and out of the well in which said pump operates; a gas conduit extending from a point above said well down into said well to a point near said chamber; means for supplying gas under pressure to the upper end of said conduit; valve means operatively connected to said fluid conduit, said valve means being situated adjacent to said chamber adapted to connect the upper portion of said chamber alternately with said gas conduit and with a port through which any gas under pressure in said chamber may escape therefrom; and means by which said fluid conduit may be mechanically rotated from a point above and outside said well to operate said valve means.

In testimony whereof I have hereunto set my hand at Tulsa, county of Tulsa, Okla., this 16th day of October, 1929.

DONALD D. BURCH.

CERTIFICATE OF CORRECTION.

Reissue Patent No. 17,674. Granted May 27, 1930, to

DONALD D. BURCH.

It is hereby certified that error appears in the printed specification of the above numbered patent requiring correction as follows: Page 2, line 107, claim 6, strike out the semi-colon and insert a comma and the word ", said"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.